United States Patent [19]

Rench

[11] Patent Number: 5,568,877
[45] Date of Patent: Oct. 29, 1996

[54] METHOD OF MANUFACTURE FOR CONTAINER FOR HOT FOOD

[75] Inventor: Frederick A. Rench, Boise, Id.

[73] Assignee: Boise Cascade Corporation, Boise, Id.

[21] Appl. No.: 383,525

[22] Filed: Feb. 3, 1995

Related U.S. Application Data

[63] Continuation-in-part of Ser. No. 308,294, Sep. 19, 1994.

[51] Int. Cl.⁶ .................. B32B 3/16; B65D 5/56
[52] U.S. Cl. .......... 220/441; 156/205; 156/210; 156/462; 156/554; 220/418; 229/906; 229/939; 229/940; 493/346; 493/381
[58] Field of Search .................. 229/146, 902, 229/906, 939, 940; 220/418, 441, 443; 493/346, 381; 156/201, 205, 207, 210, 292, 462, 472, 473, 554

[56] References Cited

U.S. PATENT DOCUMENTS

| | | | |
|---|---|---|---|
| 2,012,131 | 8/1935 | Kondolf | 220/441 |
| 2,547,005 | 4/1951 | Herrick et al. | 229/939 |
| 2,782,977 | 2/1957 | Thompson | 229/939 |
| 2,800,840 | 7/1957 | Herrick | 156/207 |
| 2,833,459 | 5/1958 | Greene | 229/939 |
| 2,933,228 | 4/1960 | Guyer | 220/443 |
| 2,980,159 | 4/1961 | Greene | 156/210 |
| 3,255,679 | 6/1966 | Eckels | 493/346 |
| 4,059,220 | 11/1977 | Lorenz | 229/939 |
| 4,374,441 | 2/1983 | Carter et al. | 493/346 |
| 5,314,738 | 5/1994 | Ichikawa | 428/182 |

FOREIGN PATENT DOCUMENTS

| | | | |
|---|---|---|---|
| 5270541 | 10/1993 | Japan | 220/441 |
| 2037226 | 7/1980 | United Kingdom | 229/939 |
| 9209486 | 6/1992 | WIPO | 229/146 |

*Primary Examiner*—Gary E. Elkins
*Attorney, Agent, or Firm*—Klarquist Sparkman Campbell Leigh & Whinston, LLP

[57] ABSTRACT

A method of manufacturing a container for the temporary storage of foods is disclosed. The container includes a corrugated medium having a single backer paper thus creating an exposed corrugated surface on a side opposite the backer. The food container is formed such that the exposed corrugation is located towards an interior surface of the container. The method of manufacture involves fabrication of a single-face sheet of corrugated material to which is affixed a tape liner along opposed side edges of the sheet. A wider tape is affixed to the sheet intermediate the lateral edge tapes. The sheet is then cut along a longitudinal midline of the intermediate tape and also across the sheet to form discrete blanks. The blanks are substantially single-face corrugated material but have double-face corrugated material along the lateral edges where the tape was applied. Thereafter, the blank may be further cut, scored and folded to form containers having a single-face, bottom panel and double-face side walls.

19 Claims, 3 Drawing Sheets

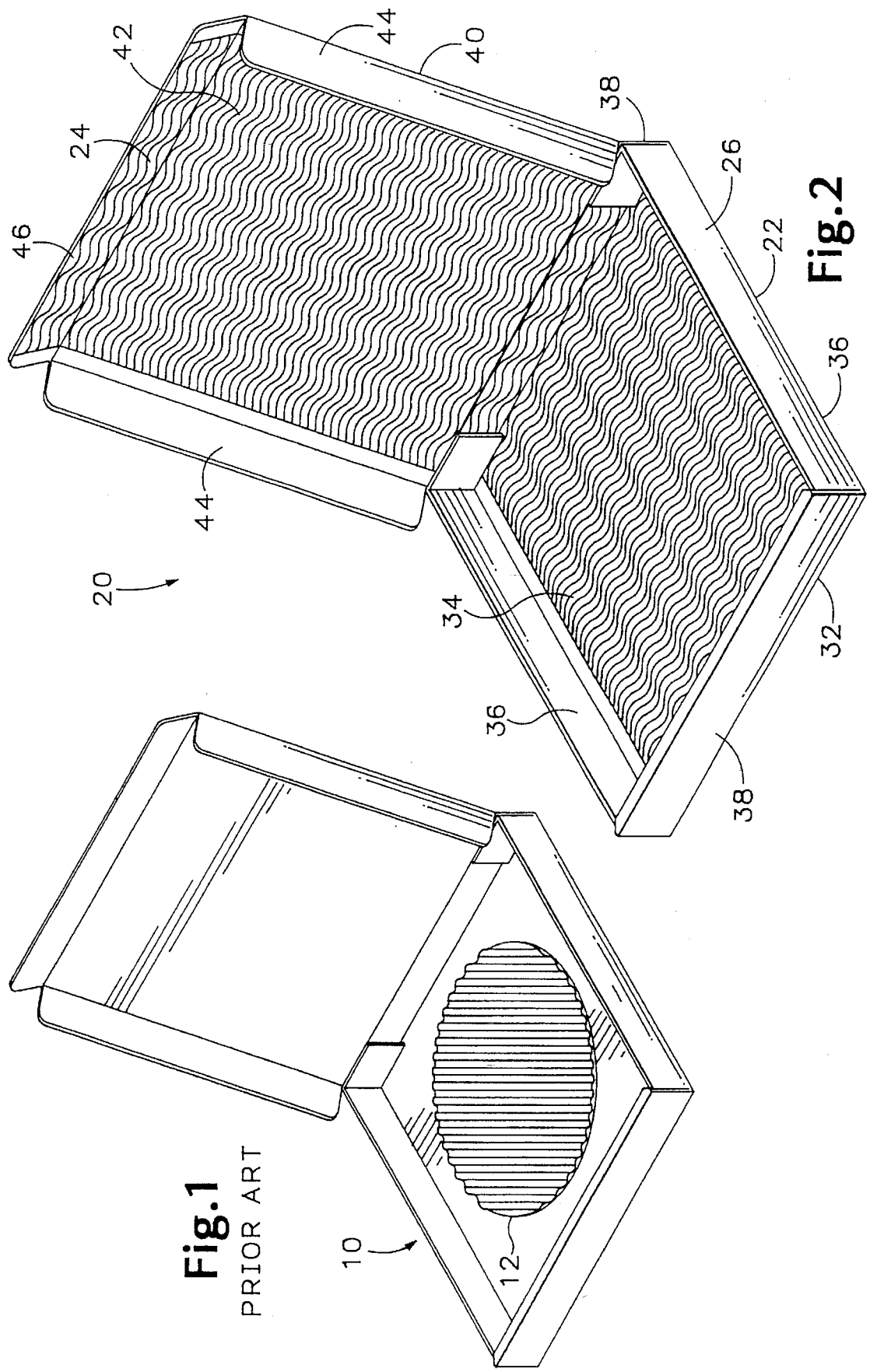

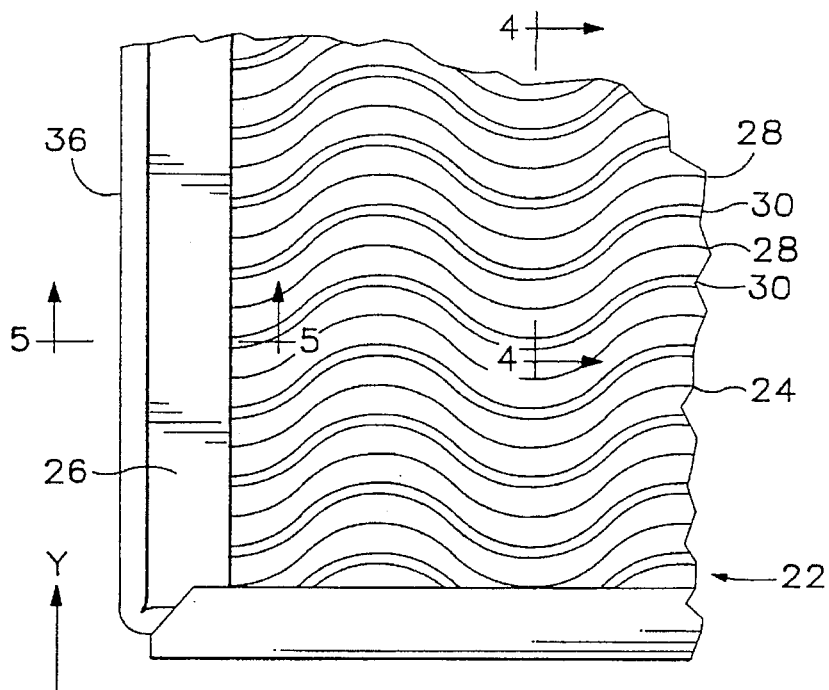
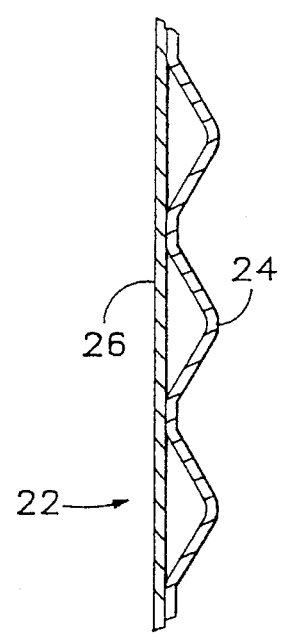
Fig.3   Fig.4
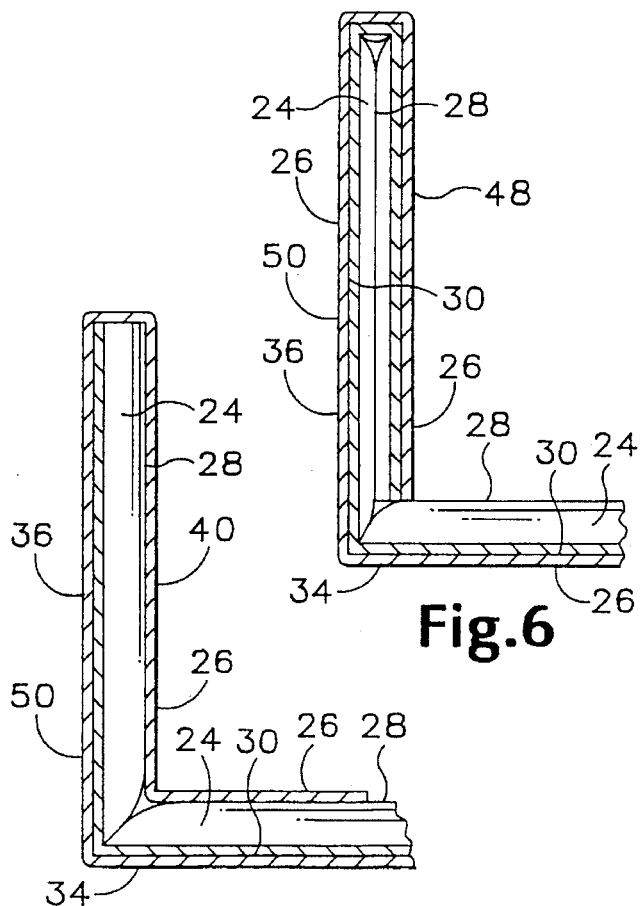
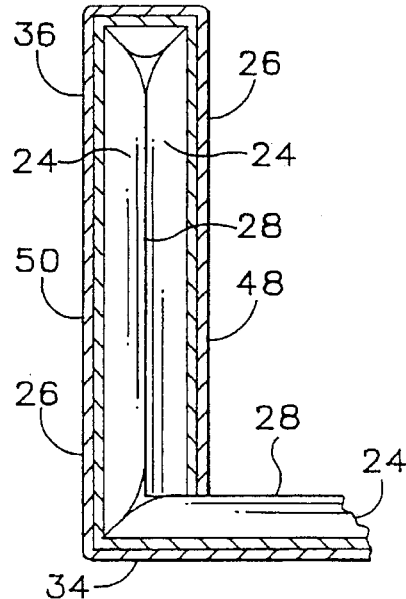
Fig.5   Fig.6   Fig.7

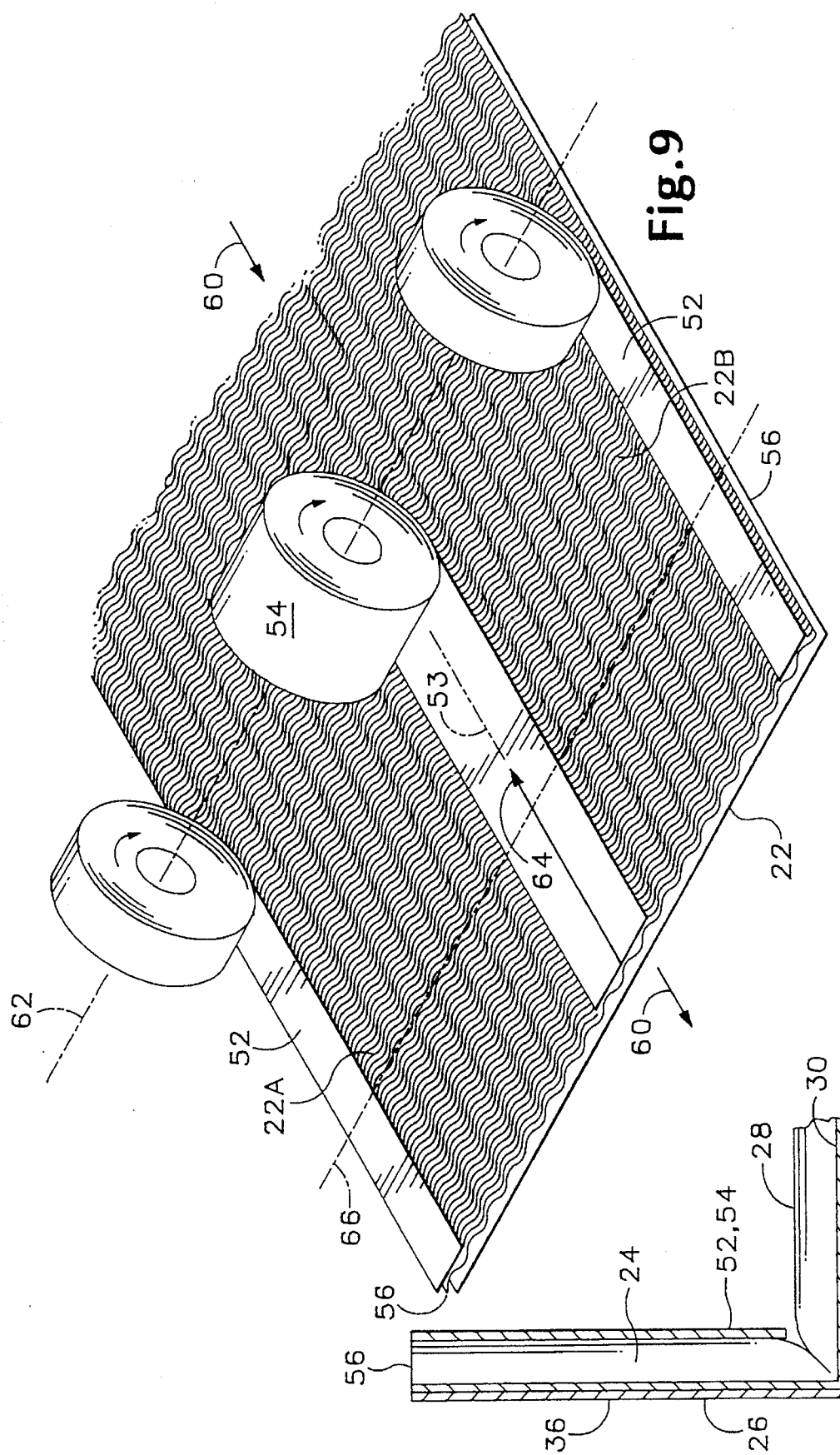

METHOD OF MANUFACTURE FOR CONTAINER FOR HOT FOOD

This application is a continuation-in-part of U.S. patent application Ser. No. 08/308,294, filed Sep. 19, 1994.

BACKGROUND OF THE INVENTION

1. Field of the Invention

This invention pertains generally to the field of containers for temporary storage of hot food, including but not limited to pizzas, hot sandwiches, and other related items.

2. Description of the Related Art

FIG. 1 is an exemplary rendition of a prior-art container for hot food such as a pizza comprising a thin corrugated container 10 in which the material includes small linear corrugations having a paper backer, or liner, adhesively affixed to both sides of the corrugations. The corrugated material is fabricated as flat stock and then cut and folded to create the enclosure 10. Many prior-art pizza boxes also include an insert pad 12 consisting of a corrugated sheet having large linear corrugations and paper backer, or liner, on a single side, thereby exposing, on one side, the ridges and furrows of the corrugations. When a pizza is placed on the exposed corrugations some air circulates underneath the pizza crust preventing it from getting soggy. The exposed corrugations also act as a receptacle for catching grease that may fall off the pizza, thereby preventing grease from pooling at the bottom of the pizza crust. The pad also acts as an insulator, helping to keep the pizza hot during its transport in the container.

The prior-art containers provide a good container for temporary storage and transportation of hot foods such as pizzas. However, there is a continuing need to save resources by reducing the amount of materials used in constructing such containers, and in efficiently making containers having less material.

SUMMARY OF THE INVENTION

The present invention provides a method of making a container for temporary storage of hot foods having many of the features and advantages of the prior-art containers but also having increased bidirectional rigidity and requiring fewer materials. The present invention preferably uses meandering waveform corrugations (as opposed to the linear corrugations of the prior art) which increases strength of the container as compared to prior containers with conventional corrugations of the same size. And, because of the increased bidirectional strength of meandering waveform corrugations (hereinafter "waveform corrugations"), it is possible to produce a corrugated container of adequate strength using waveform corrugated sheet material lined on only one side, known in the art as "single-face" material, rather than "double-face" corrugated sheets, as required with linear corrugation. Additionally, because the corrugated sheet is single-face, the waveform corrugations are exposed along an inside surface of the box to provide air circulation beneath the stored hot food. However, in the preferred embodiment, the inner surface of some sides of the container are double-face for additional strength. The present invention saves the materials associated with a second layer of liner paper and also all the paper associated with the corrugated pad 12 noted in the prior-art description.

The preferred method for fabricating the container is to form a continuous sheet of single-face corrugated material that is wide enough for making two or more containers. Liner tape is adhered to the "open" side, i.e., the side having the exposed corrugations, at regions where the container's sides will be formed. The continuous sheet having the liner tape is then cut into discrete blanks that can be formed into hot food containers.

In one preferred embodiment, illustrated, the continuous sheet is wide enough to form two containers. Thus, tape liner is applied along opposite side edges of the sheet and at one intermediate location between the side edges, dividing the sheet lengthwise into two regions across the width of the sheet, each region being bounded on opposite sides by the liner tape. The liner tape at the side edges of the sheet is one-half the width of the intermediate liner tape between the edges. When the sheet is cut into single container blanks, it is cut lengthwise along a longitudinal midline of the intermediate liner tape thus forming two sheets each having equal width liner tape along opposed side edges. The two sheets are then cut transversely into discrete, flat blanks, each blank having double-face side edges and a single-face expanse between the taped side edges. The end edges are also single-face because no tape is applied to the transverse edges. The blank may then be further cut, scored and folded into a hot food container.

The width of the single-face corrugated sheet may be varied to produce from one to several blanks with each transverse cut of the sheet after the liner tape is applied.

Various advantages and features of novelty which characterize the invention are particularized in the claims forming a part hereof. However, for a better understanding of the invention and its advantages, reference should be made to the drawings and to the accompanying description in which there is illustrated and described preferred embodiments of the invention.

BRIEF DESCRIPTION OF THE DRAWING

FIG. 1 is a perspective view showing a prior-art food container.

FIG. 2 is a perspective view showing a preferred embodiment of a food container of the present invention.

FIG. 3 is an enlarged detail plan view of a portion of the food container of FIG. 2.

FIG. 4 is a longitudinal sectional view taken along line 4—4 in FIG. 3 showing the waveform corrugations in cross-section.

FIG. 5 is a cross-sectional view taken along line 5—5 in FIG. 3 showing detail of a lateral side wall of the container of FIG. 2.

FIG. 6 is a view similar to FIG. 5 showing an alternative embodiment of the container's lateral side wall in which a portion of the corrugation is crushed.

FIG. 7 is a view similar to FIG. 5 showing another alternative embodiment of a lateral side wall wherein the side surface is applied to itself without crushing the corrugation.

FIG. 8 is a view similar to FIG. 5 showing an alternative embodiment of a lateral side wall when made according to the preferred method of manufacture shown in FIG. 9.

FIG. 9 is a perspective view of a preferred method of fabricating a hot food container of the type shown generally in FIG. 2.

DETAILED DESCRIPTION OF THE PREFERRED EMBODIMENTS

With particular reference to FIGS. 2–5, there is shown a preferred embodiment of a take-out hot food container 20 of the present invention. In FIG. 2, the container is shown in the general shape and dimension of a pizza box, but is to be understood that the principles of the invention would work equally well with alternatively shaped containers for temporary storage of other hot foods. The present invention is particularly adapted to hot foods because of its insulating qualities and its ability to suspend the food above grease that normally is associated with hot foods.

The container 20 is fabricated of a corrugated sheet 22. The sheet includes meandering waveform corrugations 24 made of paper and a paper backer or liner 26. The corrugations 24 include elongate ridges 28 and furrows 30 that are approximately parallel and evenly spaced. The ridges and furrows undulate along their longitudinal direction.

The construction of, and dimensions associated with, the meandering corrugations of the present invention are disclosed in U.S. Pat. No. 5,314,738, incorporated herein by reference.

Prior-art corrugations consist of linear, longitudinal ridges and furrows of various sizes which offer satisfactory strength against bending about a transverse axis, but offer very little strength when bent about a longitudinal axis, i.e., parallel to the corrugations. Corrugated sheets with linear corrugations are particularly weak when of single-face material, that is, lined on one side only so that the corrugations are exposed.

With respect to the reference axes x and y shown in FIG. 3, it will be noted that the corrugations 24, of the present invention provides stiffness against bending about axes parallel to both the x and y axes, even when single-face material is used, or when the corrugated medium is unlined. As shown in the preferred embodiments, the meandering corrugations 24 are longitudinally aligned along the x direction and undulate along the y direction about an axis parallel to the x axis.

As shown in FIG. 2, the single-face corrugated sheet 22 of the present invention is formed into the shape and dimension of a pizza box. The box includes a base 32 having a bottom panel 34, lateral sides 36 and end sides 38. The box also includes a lid 40 having a top panel 42, lateral sides 44 and flap 46. The box is formed such that the side of the corrugated sheet 22 having the exposed corrugations 24 is located along the interior surfaces of the box enclosure 20. By locating the exposed corrugations 24 on the inside surface, the present invention eliminates the need for an insert pad 12 associated with the prior art container 10.

Preferably, the sheet 22 is formed as shown in FIG. 9 wherein the single-face sheet 22 with waveform corrugations 24 extending across the width of the sheet has tape liners 52 and 54 applied thereto. The tape liners 52 are located along lateral side edges 56 of the sheet 22 and are applied directly onto the exposed corrugations 24 with an adhesive such as corn starch. The tape liners 52 are single-width, preferably about two inches wide. The tape liner 54 is located between the side edge tape liners 52, and is also applied directly onto the corrugations 24. The tape liner 54 is double-width, i.e., twice the width of the edge liners 52, and is preferably about four inches wide.

After the tape liners 52 and 54 are applied to the sheet 22, it is cut into discrete pieces, generally referred to as "blanks", each of which can be formed into a container. The arrangement of the tapes 52, 54 described above permits the continuous sheet 22 to be cut lengthwise by a slitter 64 (shown diagrammatically) along a longitudinal midline 53 of the double width tape 54, thereby forming two discrete, continuous corrugated sheets 22A, 22B, each wide enough for one hot food container having single-width tape liner along two opposed lateral side edges and exposed corrugation between the tape liners. After the continuous sheet 22 is slit lengthwise into two continuous sheets as described, the two sheets 22A, 22B are cut transversely along cutting line 66 into discrete blanks 55. Thus, in the example of FIG. 9, each longitudinal and transverse cut of continuous sheet 22 produces two discrete blanks 55, each with taped opposite side edges and untaped end edges. When a resulting blank is formed into a container, the double-face portions (where tape liners 52, 54 were applied) become the lateral container sides 36. FIG. 8 is a cross-sectional view of the lateral side wall 36 and intersecting bottom wall 34 of a container when fabricated using tape liners 52, 54, according to the method shown in and described with respect to FIG. 9.

FIG. 9 discloses a method of manufacturing the container shown generally in FIG. 2 but with lateral side walls as shown in FIG. 8. The method involves the use of two single-width lateral edge tape liners 52 and one intermediate double-width tape liner 54, thus producing two blanks for forming two containers with each transverse cut of continuous sheets 22A, 22B. However, it is to be understood that a greater number of intermediate, double-width tape liners 54 could be applied to the corrugated sheet 22 so as to delineate three, four or more blanks across the width of sheet 22. Accordingly, when a greater number of tape liners 54 are applied to define a greater number of blanks, a corresponding increase in the number of slitters 64 is necessary to slit the sheet 22 along each intermediate tape 54.

As schematically illustrated in FIG. 9, the preferred method of manufacture is a continuous process. First, a continuous sheet of single-face waveform corrugated sheet material is formed according to known processes, with the open corrugated side of the sheet facing upwardly and the sheet moving continuously lengthwise in the direction of arrow 60. At a double-back station 62, rolls of tape liner 52 are aligned over, and affixed to, the opposed side edges 56 of the sheet. A roll of wider intermediate tape 54 is also aligned between the edge tapes 52 and affixed to the sheet 22. Tape from all three rolls is applied to the exposed corrugations at the side edges and midline of the sheet as the sheet continues its downstream travel.

Downstream of the double-back station 62, the slitter 64 slits the sheet 22 into two continuous sheet sections 22A and 22B, along the midline 53 of tape 54. This slitting action cuts tape 54 into two equal-width portions, one covering the corrugations along the newly formed edge of each sheet section 22A and 22B, respectively.

Further downstream of the slitter 62, a cutter station includes a blade (not shown) that periodically severs the traveling sheet sections 22A and 22B into discrete blanks along a cutting line 66. Each blank has a predetermined length, determined by the period of the cutting blade and the speed of travel of the sheet, as selected based upon the desired size of the finished container 20. Although described in its preferred embodiment of slitting the continuous sheet lengthwise before making transverse cuts, an alternative embodiment includes making transverse cuts before slitting the sheets along a lengthwise axis.

FIG. 5 shows a cross-section of a lateral side wall 36 of the container of FIG. 2 in which the liner 26 extends beyond the corrugated medium and has been folded back over the corrugated medium 24 and adhered to ridges 28 to form double-face corrugation along lateral sides 36. The liner 26 may also be sized so that it extends a short distance onto the inside of the bottom panel 34, also as shown in FIGS. 2 and 5, thereby providing additional stiffening along the side edges of such panel. Although not shown, the lateral sides 44 are formed in a similar manner.

A side wall 36 similar to that of FIG. 5 can be formed according to the method of FIG. 9 simply by using somewhat wider tape liners 52, 54 than shown in FIGS. 8 and 9. When the wider tape liners are used, portions of such tape liners will extend from the lower inside surface of side walls 36 onto the ridges of bottom wall corrugations 28 when the container is assembled, thereby providing narrow, double-face strips along the opposite side edges of bottom wall 34.

Alternatively, the lateral sides 36 may be formed by crushing a portion of the corrugation 24 as is most clearly seen in FIG. 6. In this embodiment, a folded-over portion 48 is crushed along a width approximately equal to the height of the lateral side 36 so that the ridges 28 are pressed approximately flat with the furrows 30. Thereafter, the crushed portion is folded over and adhered to form the lateral side 36. The lateral sides 44 may be formed in a similar manner.

Alternatively, the lateral sides 36 and 44 may be formed as shown in FIG. 7 wherein the liner 26 is cut the same size as the corrugation 24 and the sides are fabricated simply by folding over.

The folded-over portion 48 may be adhered to upright portion 50 or it may be held in place by means of tabs that extend through the bottom panel 34.

Numerous characteristics and advantages of the invention have been set forth in the foregoing description, together with details of the structure and function of the invention. The novel features hereof are pointed out in the appended claims. The disclosure is illustrative only, and changes may be made in detail, especially in matters of shape, size, direction of rotation and arrangement of parts within the principle of the invention to the full extent indicated by the broad general meaning of the terms in the claims.

I claim:

1. A method of making a hot food container, comprising the steps of:
    (a) providing a continuous length sheet of single-face corrugated material having opposite side edge portions;
    (b) affixing a tape having a first width onto exposed corrugations of the sheet along the length of each of the two opposed side edge portions;
    (c) cutting the sheet transversely thereby forming discrete pieces each having a length suitable for fabrication into a single hot food container, each piece having double-face taped side edge portions and exposed corrugations extending between the taped side edge portions; and
    (d) bending the double-face side edge portions to a position substantially orthogonal to the exposed corrugations for forming a container from the blank having double-face side walls and a single-face bottom wall.

2. The method of claim 1 wherein the sheet has a width sufficient to form a plurality of containers and further comprising the step of affixing to exposed corrugations of the sheet at a position intermediate the side edges at least one additional tape having a second width, with the additional tape extending parallel to the side edges.

3. The method of claim 2 further comprising the step of cutting the sheet along a proximal midline of the additional tape, thereby forming discrete pieces, each having a length and width suitable for fabrication into a single hot food container, each piece having double-face side edge portions and single-face sheet material therebetween.

4. The method of claim 3 wherein the sheet is cut along the proximal midline of the additional tape before the sheet is cut transversely of its length.

5. The method of claim 3 wherein the sheet is cut transversely before the sheet is cut along the proximal midline of the additional tape.

6. The method of claim 1 wherein the corrugations in the sheet of corrugated material are arranged so as to meander along parallel, nonlinear paths between the opposite side edges of the sheet.

7. A hot food container formed from a blank made according to the method of claim 1.

8. A pizza box formed from a blank made according to the method of claim 1.

9. A method of fabricating a hot food container, comprising the steps of:
    (a) forming an elongate sheet of single-face corrugated sheet material having a corrugated side and a liner side with corrugations on the corrugated side extending in parallel nonlinear paths from a first lateral margin of the sheet to a second, opposing lateral margin of the sheet;
    (b) affixing a first tape having a first width to the corrugated side of the sheet along the first lateral margin of the sheet;
    (c) affixing a second tape having the first width to the corrugated side of the sheet along the second lateral margin of the sheet;
    (d) affixing at least one intermediate tape having a second width substantially twice the first width to the corrugated side of the sheet between and spaced from the first and second tapes;
    (e) cutting the sheet along the at least one intermediate tape and transversely to form discrete blanks such that each blank has at least two edge portions of double-face sheet material and an intermediate expanse of single-face sheet material; and
    (f) bending the edge portions having double-face sheet material into a location that is substantially orthogonal to the intermediate expanse of single-face sheet material.

10. The method of claim 9 wherein the at least one intermediate tape is arranged to be substantially parallel to the first and second tapes and substantially half-way between the first and second tapes.

11. The method of claim 10 wherein the cutting step comprises cutting the sheet along a proximal midline of the intermediate tape to thereby cut the intermediate tape in half and thereby form two tapes of the first width.

12. The method of claim 9 wherein the tapes comprise a paper material.

13. A hot food container made from a blank formed by the method of claim 9.

14. A pizza box made from a blank formed by the method of claim 9.

15. A method of making a blank for forming a hot food container having a single-face corrugated bottom wall and double-face corrugated opposite side walls of predetermined height, the method comprising selecting liner tape to have a width at least substantially as great as the height of the container sidewalls, applying the liner tape continuously across the corrugations along opposite side edge portions of a sheet of single-face corrugated sheet material in which the corrugations extend nonlinearly and continuously from one side edge to an opposite side edge of the sheet throughout its length such that the opposite side edge portions of the sheet become double-face for forming the double-face side walls of the container blank formed from the sheet.

16. The method of claim 15, including the step of cutting the sheet transversely from one side edge to the other side edge at intervals along the length of the sheet to form container blanks, each with double-face side edge portions.

17. The method of claim 15, including applying an intermediate liner tape across the corrugations between the opposite side edges of the sheet and parallel to the liner tape along the opposite side edges to subdivide the sheet lengthwise into multiple sheet sections, and then cutting the sheet lengthwise along the midline of the intermediate liner tape to separate the sheet into its multiple sheet sections, each with double-face opposite side edge portions.

18. The method of claim 17, including the step of selecting the intermediate tape to have a width at least about twice the width of the liner tapes at said edge portions.

19. A method of making a blank for a hot food container having a single-face corrugated bottom wall and double-face corrugated opposite side walls, the method comprising:

(a) providing a continuous sheet of single-face corrugated sheet material with the corrugations extending continuously between opposite side edges of the sheet;

(b) applying edge liner tape of a first width to the corrugations along the opposite side edges;

(c) applying intermediate liner tape of a second width substantially greater than the first width to the corrugations parallel to the edge liner tapes at a position on the sheet spaced between the opposite side edges to subdivide the sheet lengthwise into multiple sheet sections;

(d) slitting the sheet lengthwise along a midline of the intermediate tape to form two discrete sheet sections, each having double-face opposite side edge portions; and (e) cutting the sheet sections transversely at intervals along their lengths from one side edge to the opposite side edge thereof to form multiple discrete blanks, each having double-face opposite edge portions having a width substantially equal to the first width for forming a container having double-face opposite side walls having a height substantially equal to the first width and an expanse of single-face material between the double-face side walls.

\* \* \* \* \*